(12) United States Patent
Zhou et al.

(10) Patent No.: US 9,151,404 B2
(45) Date of Patent: Oct. 6, 2015

(54) BUTTON SWITCH OUTLET MECHANISM

(75) Inventors: Huasong Zhou, Xiamen (CN); Fuli Guo, Xiamen (CN); Xiang Huang, Xiamen (CN); Haisong Peng, Xiamen (CN)

(73) Assignees: XIAMEN SOLEX HIGH-TECH INDUSTRIES CO., LTD., Xiamen (CN); Huasong Zhou, Xiamen (CN)

( * ) Notice: Subject to any disclaimer, the term of this patent is extended or adjusted under 35 U.S.C. 154(b) by 273 days.

(21) Appl. No.: 13/877,617

(22) PCT Filed: Oct. 8, 2011

(86) PCT No.: PCT/CN2011/080525
§ 371 (c)(1),
(2), (4) Date: Apr. 3, 2013

(87) PCT Pub. No.: WO2012/045276
PCT Pub. Date: Apr. 12, 2012

(65) Prior Publication Data
US 2013/0327431 A1 Dec. 12, 2013

(30) Foreign Application Priority Data

Oct. 9, 2010 (CN) .......................... 2010 1 0501317
Oct. 9, 2010 (CN) ....................... 2010 2 0554259 U

(51) Int. Cl.
*F16K 11/22* (2006.01)
*F16K 31/44* (2006.01)
(Continued)

(52) U.S. Cl.
CPC .............. *F16K 31/44* (2013.01); *B05B 1/1609* (2013.01); *B05B 1/18* (2013.01); *E03C 1/023* (2013.01); *Y10T 137/877* (2015.04)

(58) Field of Classification Search
CPC ....... F16K 31/00; F16K 35/04; F16K 35/025; F15B 15/26; F15B 15/261; B05B 1/1609; E03C 1/023
USPC ..................... 137/881, 883, 878; 251/89, 111
See application file for complete search history.

(56) References Cited

U.S. PATENT DOCUMENTS 3,234,964 A * 2/1966 Tinsley et al. ................. 137/884
3,552,436 A * 1/1971 Stewart ......................... 137/883

(Continued)

FOREIGN PATENT DOCUMENTS

CN 101982242 A 3/2011
CN 201807469 U 4/2011

(Continued)

*Primary Examiner* — Marina Tietjen
*Assistant Examiner* — Seth W Mackay-Smith
(74) *Attorney, Agent, or Firm* — Rabin & Berdo, P.C.

(57) ABSTRACT

The present invention discloses a button switch outlet mechanism, which is provided with a body communicating with the water source and in which at least two water passages are arranged, wherein, it is further provided with a switch unit and a water division unit mounted in the body, the switch unit comprises at least two switch buttons that are arranged to the control poles of the switch buttons and a limiting assembly respectively, the limiting assembly controls that one of the switch button is pressed or all the switch buttons are pressed simultaneously and located to the limiting plate; the water division unit is connected to the switch unit to control that the water passages are communicated with the water source respectively or simultaneously. The cooperation of the components of the present outlet mechanism is tight and artistic with effective and stable switch.

18 Claims, 15 Drawing Sheets

(51) Int. Cl.
  *B05B 1/16* (2006.01)
  *B05B 1/18* (2006.01)
  *E03C 1/02* (2006.01)

(56) References Cited

U.S. PATENT DOCUMENTS

| | | | | |
|---|---|---|---|---|
| 3,559,683 | A | * | 2/1971 | Maguire .................. 137/877 |
| 4,241,761 | A | * | 12/1980 | Miller ..................... 137/883 |
| 4,491,157 | A | * | 1/1985 | Hashimoto ............... 137/871 |
| 4,597,723 | A | * | 7/1986 | Sember et al. ............ 417/440 |
| 5,823,229 | A | | 10/1998 | Bertrand et al. |

FOREIGN PATENT DOCUMENTS

| | | |
|---|---|---|
| FR | 2275254 A1 | 1/1976 |
| JP | 9052061 A | 2/1997 |
| JP | 2001218691 A | 8/2001 |
| JP | 2002165719 A | 6/2002 |
| JP | 2002194782 A | 7/2002 |
| JP | 2009006321 A | 1/2009 |
| JP | 2010046497 A | 3/2010 |

* cited by examiner

BUTTON SWITCH OUTLET MECHANISM

FIELD OF THE INVENTION

The present invention relates to bathroom field, more particular to a button switch outlet mechanism and the switch method thereof.

BACKGROUND OF THE INVENTION

The outlet mechanism employing the button to switch waterways is convenient, the users only need one hand to press the button to achieve the function with good practicability, but the inner structure of the button switch outlet mechanism at the present market is complicated, the switch movement among different buttons needs the cooperation of at least two limiting plate to achieve, and it is not stable.

SUMMARY OF THE INVENTION

The object of the present invention is to offer a button switch outlet mechanism which overcomes the defect of the button switch outlet mechanism at the prior.

One of the technical proposal solving the technical matter in the present invention is:

Button switch outlet mechanism, which is provided with a body communicating with a water source and in which at least two water passages are arranged, it is further provided with a switch unit and a water division unit mounted in the body, The switch unit comprises at least two switch buttons that are arranged to control poles of the switch buttons and a limiting assembly respectively, the limiting assembly comprises a limiting plate and the limiting blocks which are arranged to the switch buttons respectively, and limiting holes coupling with the limiting blocks are arranged on the limiting plate, and limiting plate is provided with at least two positions which are horizontal sliding along with the up and down movement of the switch buttons, the first position is that one of the switch buttons moves downward and is located in the limiting hole with other switch buttons keeping still, the second position is that all the switch buttons move downward and are limited in the corresponding limiting holes simultaneously;

The water division unit comprises the sealing elements and seal valves of which the number is equal to that of the switch buttons, the sealing elements are connected to the control poles respectively and are controlled by the control poles to control the corresponding seal valves to seal one of the water passages or communicate one of the water passages to the water source.

In a preferred embodiment, the shapes of the limiting blocks are the same and are unilateral hooked with a bevel and an upper locating surface.

In a preferred embodiment, the switch unit also comprises a reset button that are located in the limiting plate after moving downward and reset all the switch buttons, the reset button is provided with a limiting block coupling with the limiting plate, and is bilateral hooked, one side of which is provided with a bevel and an upper locating surface, the other side of which is provided with a lower bevel and a lower locating surface.

In a preferred embodiment, the switch unit also comprises springs coupling with the switch button and the reset button respectively.

In a preferred embodiment, the control poles are arranged to the springs coupling with the switch buttons in a unibody manner.

In a preferred embodiment, the switch button is provided with a cover edge, and the control poles are located under the cover edges.

In a preferred embodiment, the switch button is provided with a cover edge, one end of the periphery of the cover edge extends outward to form the control pole.

In a preferred embodiment, the limiting assembly also comprises a spring that is against the limiting plate on horizontal direction, which is compressed or loosen along with the horizontal sliding of the limiting plate.

In a preferred embodiment, the control poles are flexible, and sockets for connecting the control poles are arranged on the sealing element.

Another technical proposal solving the technical matter in the present invention is:

Button switch outlet mechanism, which is provided with a body communicating with a water source and in which at least two water passages are arranged, it is further provided with a switch unit and a water division unit mounted in the body, The switch unit comprises at least two switch buttons that are arranged to control poles of the switch buttons and a limiting assembly respectively and a reset button that are located in the limiting plate after moving downward and reset all the switch buttons, the limiting assembly comprises a limiting plate and the limiting blocks which are arranged to the switch buttons respectively, and limiting holes coupling with the limiting blocks are arranged on the limiting plate, and the limiting plate is provided with at least two positions which are horizontal sliding along with the up and down movement of the switch buttons, the first position is that one of the switch buttons moves downward and is located in the limiting hole with other switch buttons keeping still, the second position is that another switch button moves downward and is located in the corresponding limiting hole, and the switch button located at the first position is reset;

The water division unit comprises the sealing elements and seal valves of which the number is equal to that of the switch buttons, the sealing elements are connected to the control poles respectively and are controlled by the control poles to control the corresponding seal valves to seal one of the water passages or communicate one of the water passages to the water source.

In a preferred embodiment, the shapes of the limiting blocks of switch buttons and the reset button are different from each other; the limiting block of one button is unilateral hooked with a bevel and an upper locating surface, the limiting block of another button is bilateral hooked, one side of which is provided with a cambered surface and an upper locating surface, the other side of which is provided with a lower cambered surface and a lower locating surface; the limiting block of the reset button is bilateral hooked, one side of which is provided with a bevel and an upper locating surface, the other side of which is provided with a lower bevel and a lower locating surface.

Another technical proposal solving the technical matter in the present invention is:

The switch method of the button switch outlet mechanism, the number of the switch buttons is two, and the body is provided with two water passages, and the switch method comprises:

Step 1 the water source is open, the first switch button is pressed and located to the limiting plate, the reset button is kept at original location by the limiting assembly, and the second switch button is also kept at original location, namely not located to the limiting plate, and the first seal valve is sealed by the corresponding first sealing element, the first water passage is sealed by the first seal valve, and the second water passage is communicated with the water source;

Step 2 the second switch button is pressed and located to the limiting plate, the reset button is kept at original location by the limiting assembly, namely not located to the limiting plate, the first switch button is ejected from the limiting plate, and the seal from the first sealing element to the first seal valve is canceled, the second seal valve is sealed by the corresponding second sealing element, the second water passage is sealed by the second seal valve, and the first water passage is communicated with the water source;

Step 3 the reset button is pressed and located to the limiting plate, the second switch button is ejected from the limiting plate, and the first switch button is kept still, the seal from the second sealing element to the second seal valve is canceled, and the first and second water passages are communicated with the water source;

Step 4 the first and the second switch buttons are pressed simultaneously and located to the limiting plate, the first seal valve is sealed by the corresponding first sealing element, the first water passage is sealed by the first seal valve, and the second seal valve is sealed by the corresponding second sealing element, the second water passage is sealed by the second seal valve, and the outlet mechanism is stopped;

The water passages are communicated with the water resource respectively or simultaneously, or the outlet mechanism is stopped.

Another technical proposal solving the technical matter in the present invention is:

The switch method of the button switch outlet mechanism, the number of the switch buttons is two, and the body is provided with two water passages, and the switch method comprises:

Step 1 the water source is open, the first switch button is pressed and located to the limiting plate, the reset button and the second switch button are kept at original location by the limiting assembly, namely not located to the limiting plate, and the first seal valve is sealed by the corresponding first sealing element, the first water passage is sealed by the first seal valve, and the second water passage is communicated with the water source;

Step 2 the reset button is pressed and located to the limiting plate, the second switch button is kept at original location by the limiting assembly, the first switch button is ejected from the limiting plate, the seal from the first sealing element to the first seal valve is canceled, and the first and second water passages are communicated with the water source;

Step 3 the second switch button is pressed and located to the limiting plate, the first button is kept at original location by the limiting assembly, the reset button is ejected from the limiting plate, the second seal valve is sealed by the corresponding second sealing element, the second water passage is sealed by the second seal valve, and the first water passage is communicated with the water source;

Step 4 the switch buttons and the reset button are switched in such a cycle, so that the water passages is chosen to be communicated with the water resource respectively or simultaneously.

Compared with the technical proposal at the prior, the benefits of the present invention are:

1 the button switch outlet mechanism in the present invention comprises a switch unit and a water division unit, the users can control that the water division unit seals the corresponding seal valve through pressing the switch unit, and then the corresponding water passage is sealed, namely needed outlet function can be achieved, the cooperation of the components of the present outlet mechanism is tight and artistic with effective and stable switch;

2 the limiting assembly of the switch unit is provided with a limiting plate with limiting holes that can slides horizontally, the limiting blocks coupling with corresponding limiting holes are arranged on the button, so that the movement of the buttons can be controlled through the limiting plate, because the shapes of the limiting blocks of the switch buttons are the same, the switch buttons can also be pressed simultaneously and located to the limiting plate, and the outlet mechanism is stopped at this moment, the functions are complete;

3 the limiting assembly of the switch unit is provided with a limiting plate with limiting holes that can slides horizontally, the limiting blocks coupling with corresponding limiting holes are arranged on the button, so that the movement of the buttons can be controlled through the limiting plate, because the shapes of the limiting blocks of the switch buttons and the reset button are different from each other, only one button can be pressed and located to the limiting plate each time, and other buttons are kept at original location at this moment, so that the reliability of the waterway switch is guaranteed;

4 the switch unit also comprises a reset button, when it is pressed and located to the limiting plate, the switch buttons can be reset, and corresponding outlet function is achieved, and the outlet function of the outlet mechanism is diversified;

5 the switch buttons and the reset button are coupling with a spring respectively, and the reset of the button is achieved.

6 the control poles can be arranged at different position, such as arranged under the cover edge of the switch button, or arranged on the spring coupling with the switch button in a unibody manner, or arranged to the cover edge of the switch button directly, which is appropriate for industrial production;

7 the limiting assembly also comprises a spring which is against the limiting plate on horizontal direction and can be compressed or loosen along with the horizontal sliding of the limiting plate, so that the movement of the control buttons can be controlled more effectively by the limiting assembly;

8 the control pole is flexible, and the sockets connecting the control poles are arranged to the sealing element, so that the connection between the switch unit and the water division unit is achieved.

BRIEF DESCRIPTION OF THE DRAWINGS

With the following description of the drawings and specific embodiments, the invention shall be further described in details.

REFERENCE SIGNS

Body—100; inlet end—110; first inlet hole—111; first water passage—120; second water passage—130; first outlet end—140; second outlet end—150; switch unit—200; first switch button—210; second switch button—220; reset button—230; cover edge—213, 223; first control pole—211; second control pole—221; limiting assembly—240; limiting plate—241; first, second, third liming block—2421, 2422, 2423; first, second, third liming hole—2431, 2432, 2433; water division unit—300; first sealing element—311; second sealing element—312; socket—3111, 3121; first seal valve—321; second seal valve—322; active block—3211, 3221; spring, 212, 222, 231, 244, 331, 332.

DESCRIPTION OF THE PREFERRED EMBODIMENTS

According to FIG. 1 to 12, the button switch outlet mechanism offered by the first embodiment in the present invention is described.

Figure 1:
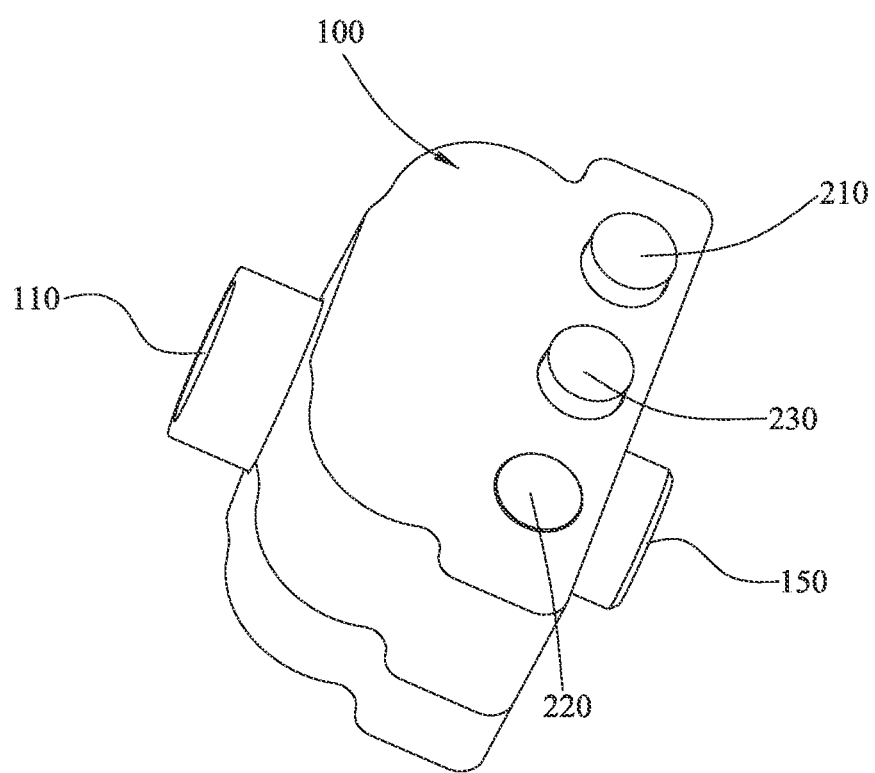
FIG. 1 shows the solid abridged general view of the button switch outlet mechanism of the first embodiment.
Figure 2:
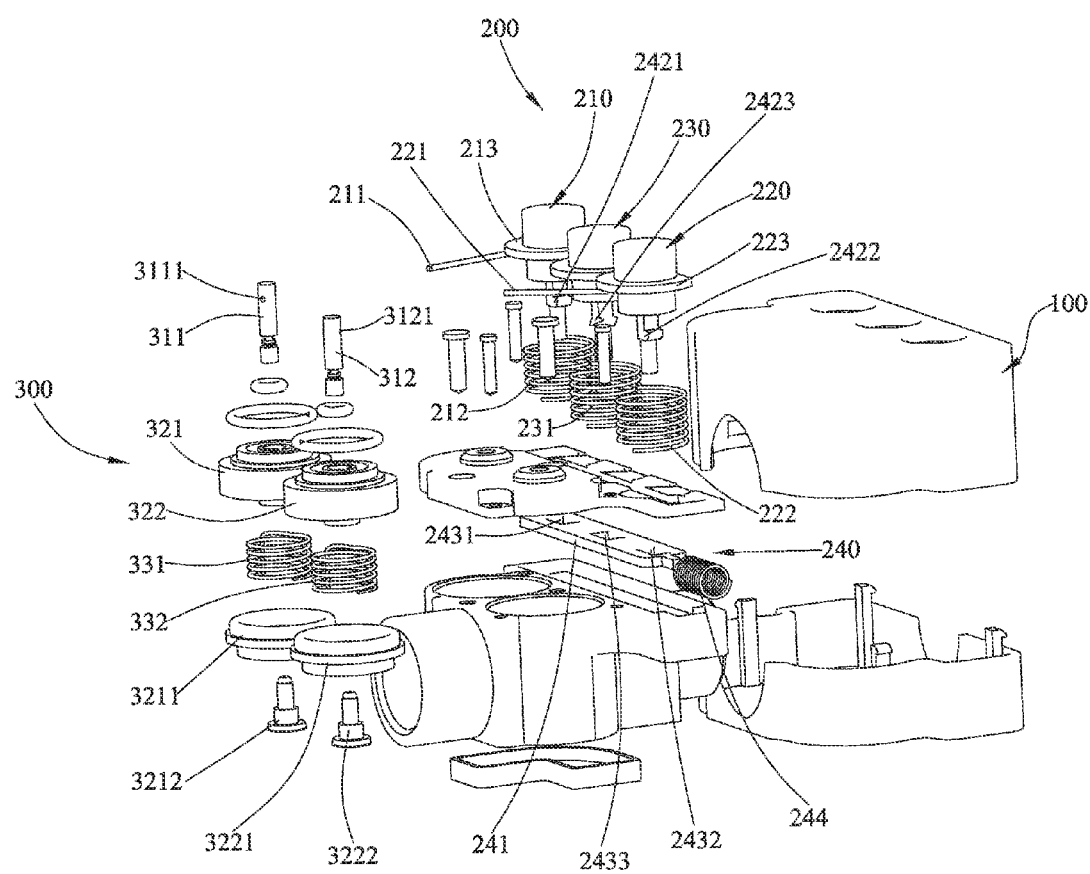
FIG. 2 shows the exploded view of the button switch outlet mechanism of the first embodiment.
Figure 3:
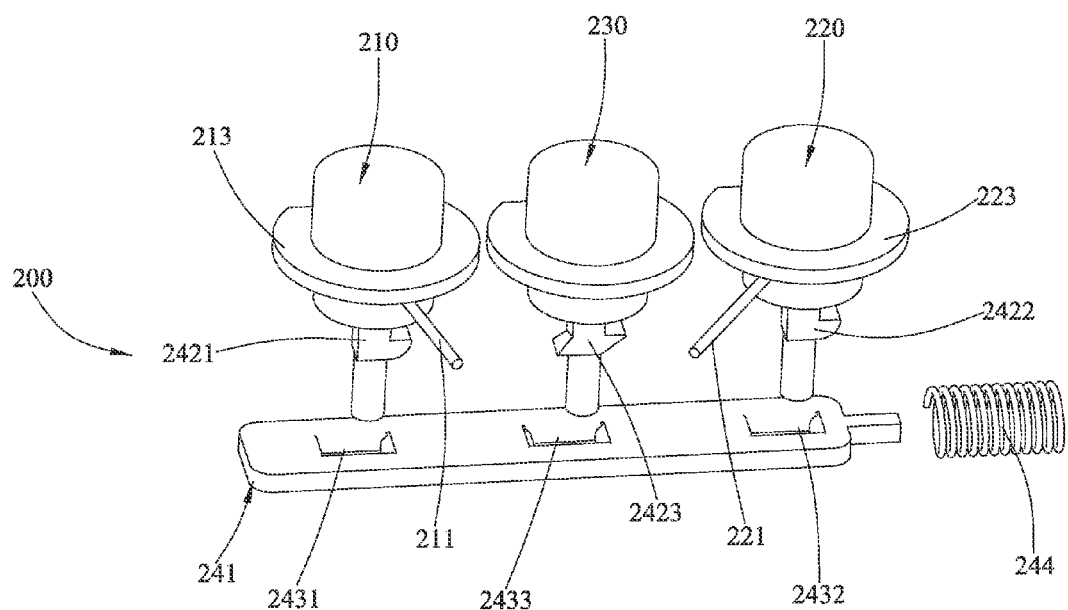
FIG. 3 shows solid abridged general view of switch unit of the first embodiment.

According to FIGS. 1 and 2, the button switch outlet mechanism mainly comprises a body 100, a switch unit 200 and a water division unit 300, wherein, The body 100 is a box body, which is provided with an inlet end 110 communicating with the water source and two outlet ends 140, 150, the inlet end 110 is provided with the first inlet hole 111 and the second inlet hole (not shown because of the angle), a first water passage 120 and a second water passage 130 are also arranged in the body 100, the first inlet hole 110 is corresponding to the first water passage 120, the second inlet hole is corresponding to the second water passage 130, and the first and the second water passages 120 and 130 are communicating with the first and the second outlet ends 140 and 150 respectively, the inlet end is pipe-in-pipe structure, namely it is not only the inlet end, but also the outlet end 140 of the first water passage 120;

The switch unit 200 comprises a first switch button 210, a second switch button 220, a reset button 230 and a limiting assembly 240; the switch buttons and the reset button are all expose out of the body 100 for user's operation; the first switch button 210 is provided with a cover edge 213, a flexible control pole 211 is fixed below the cover edge 213, and a spring 212 is sleeved to the first switch button 210; the second switch button 220 is provided with a cover edge 223, a flexible control pole 221 is fixed below the cover edge 223, and a spring 222 is sleeved to the second switch button 220; the reset button 230 is sleeved in a spring 231; the limiting assembly 240 comprises a limiting plate 241 and three limiting blocks 2421, 2422 and 2423, the shapes of the first limiting block 2421 and the second limiting block 2422 are the same unilateral hooked with a bevel and an upper locating surface 2424; the third limiting block 2423 is bilateral hooked, one side of which is provided with a bevel and an upper locating surface 2424, the other side of which is provided with a lower bevel and a lower locating surface 2425, the vertical dimension between the upper locating surface 2424 and the lower locating surface 2425 is equal to the thickness of the limiting plate 241; the limiting plate 241 is under the switch buttons and the reset button, and is against the spring 212, 222 and 231, and three limiting holes 2431, 2432 and 2433 which are coupling with the limiting blocks respectively are opened on the limiting plate 241, and a spring 244 is against the horizontal direction of the limiting plate 241, the spring 244 is compressed or loosen along with the horizontal sliding of the limiting plate 231, and the limiting blocks 2421, 2422 and 2423 are arranged on the first switch button 210, the second switch button 220 and the third switch button 230 in unibody manner;

The water division unit 300 comprises a first sealing element 311, a second sealing element 312, a first seal valve 321 coupling with the first sealing element 311 and a second seal valve 322 coupling with the second sealing element 312; the sealing elements are made of silica gel, a socket 3111 is opened on the first sealing element 311, and the first control pole 211 is inserted into the socket 3111, and a socket 3121 is opened on the second sealing element 312, and the second control pole 221 is inserted into the socket 3121, so that switch unit 200 is connected to the sealing elements, namely connected to the water division unit 300, therefore, the movement of the buttons can used for driving the movement of the sealing elements through the control poles; the seal valve is the pilot valve that can be controlled by the water pressure and be self-locking, and the first seal valve 321 is coupling with a active block 3211 and a spool 3212, and the second seal valve 322 is coupling with a active block 3221 and a spool 3222, the active block is made of silica gel, and two springs 331 and 332 can be arranged to the water division unit 300 if needs be, which are arranged between the seal valves and the active blocks respectively.

Figure 4:
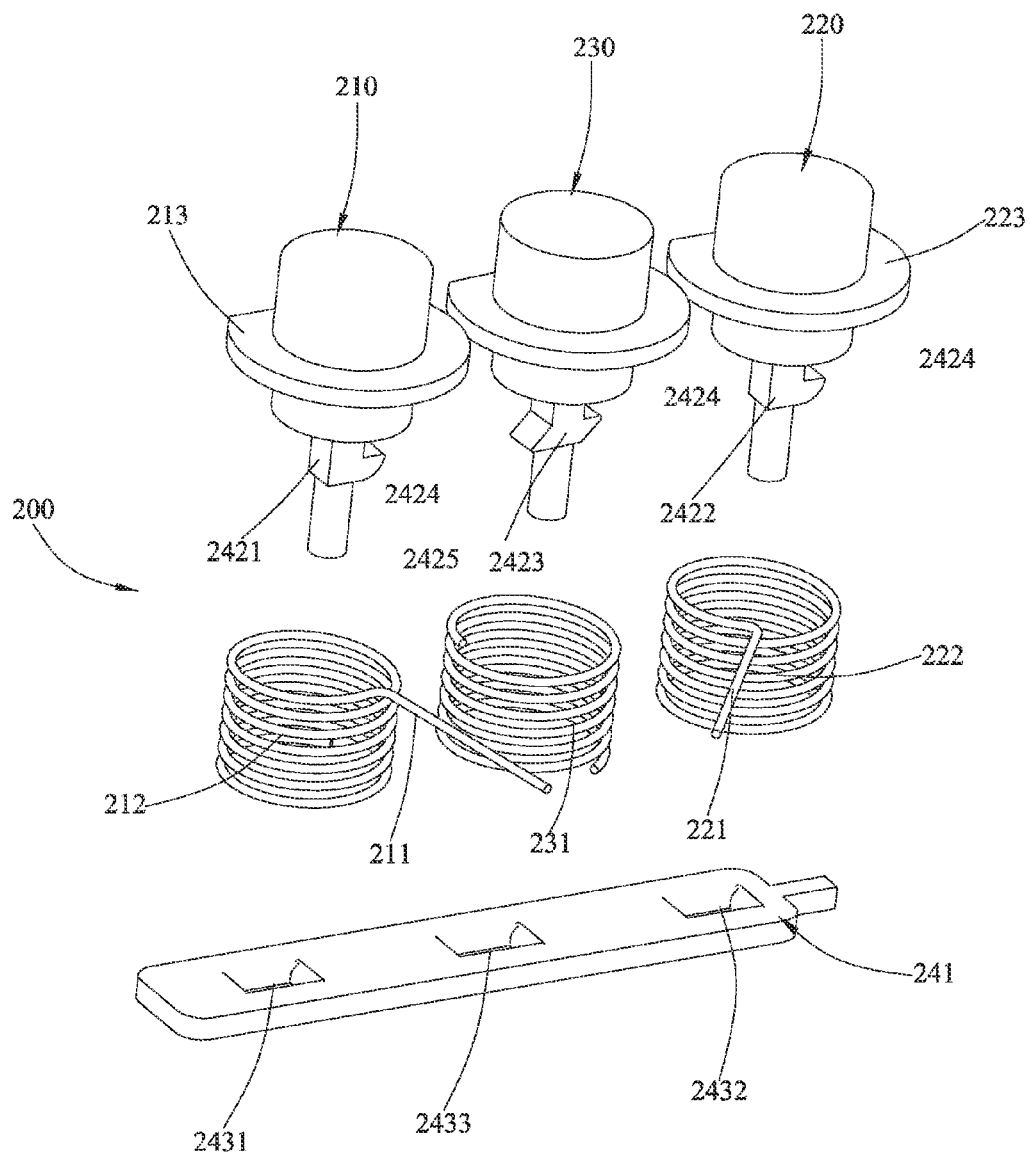
FIG. 4 shows solid abridged general view that the first and the second control poles are arranged to the spring.

The switch unit in the present embodiment can be designed to be other two kinds of structures;

The first kind of structure is shown in FIG. 4, the control poles 211 and 221 are arranged above the spring 212 and 222 in a unibody manner, which is better for large scale industrial production.

Figure 5:
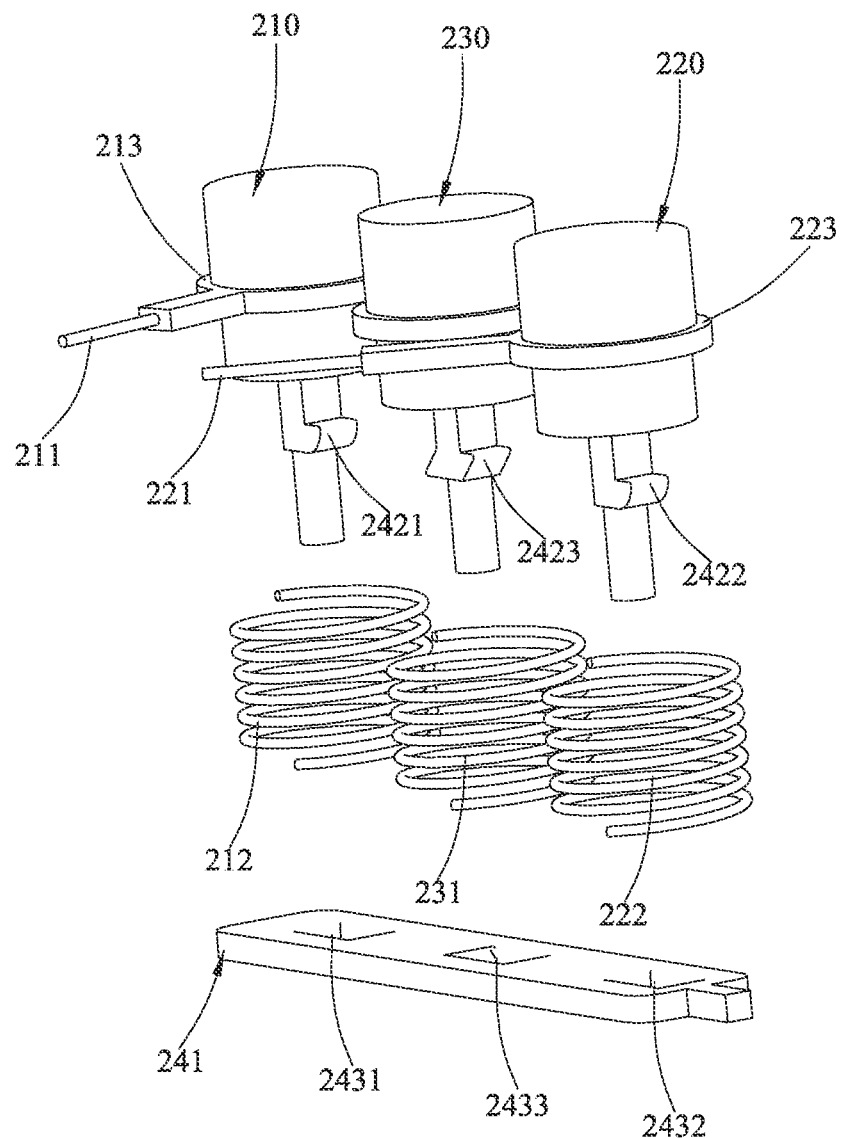
FIG. 5 shows solid abridged general view that the first and the second control poles are arranged to the cover edges of the first and the second switch button respectively.

The second kind of structure is shown in FIG. 5, one side of the periphery of the cover edge 213 of the first switch button 210 extends outward to form a first control pole 211, and one side of the periphery of the cover edge 223 of the second switch button 220 extends outward to form a second control pole 221.

FIG. 6 to 14 show the switch process of different water passages o the button switch outlet mechanism in the present invention.

Figure 6:
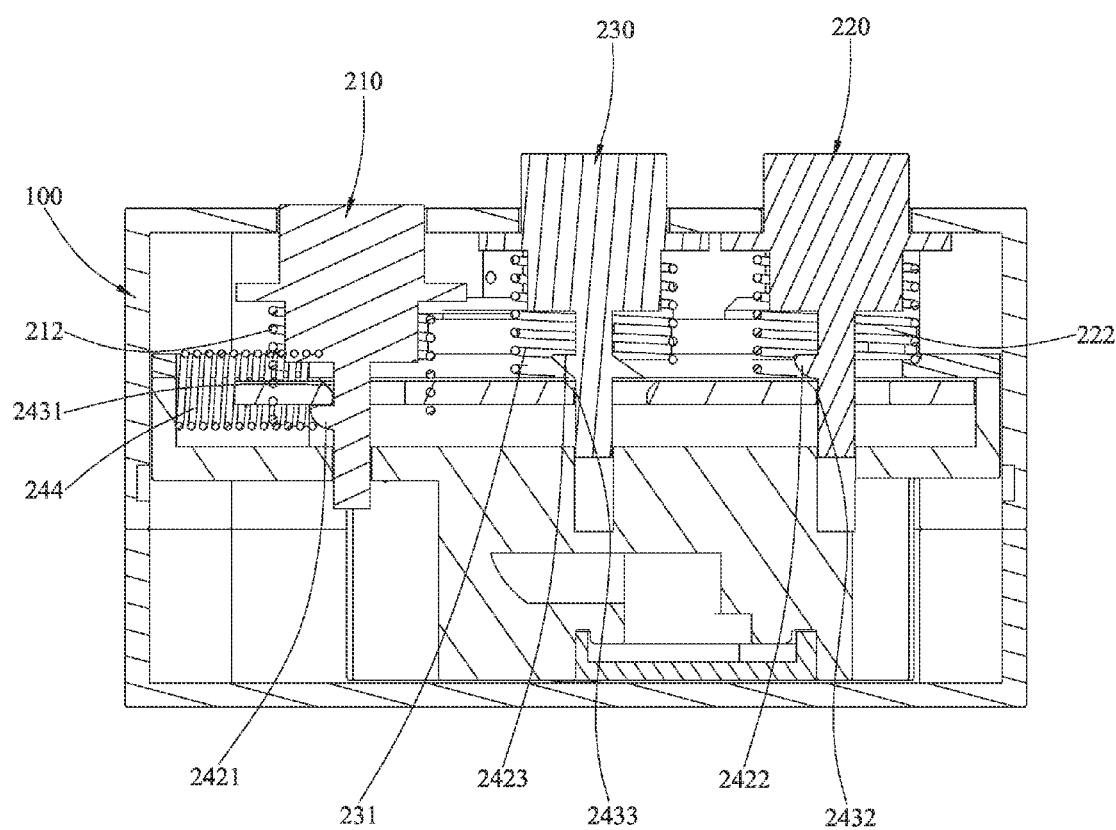
FIG. 6 shows the first sectional view of outlet mechanism of the first embodiment, the second water passage is communicating with the water source.
Figure 7:
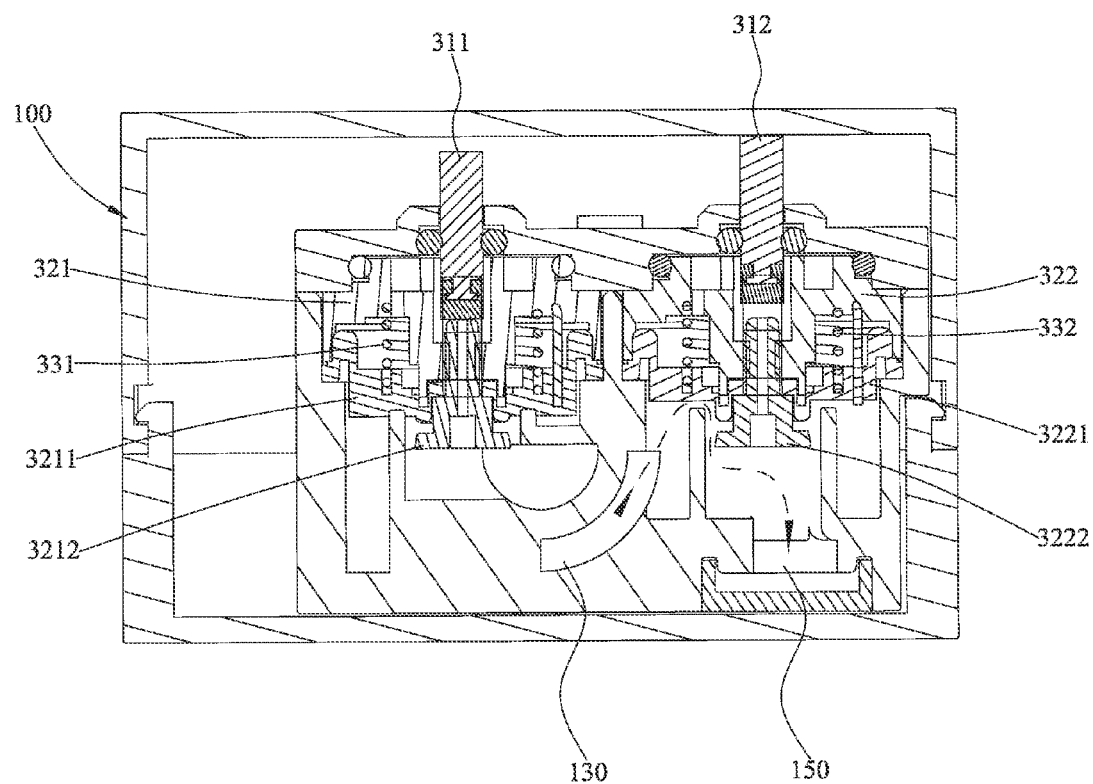
FIG. 7 shows the second sectional view of outlet mechanism of the first embodiment, the second water passage is communicating with the water source.
Figure 8:
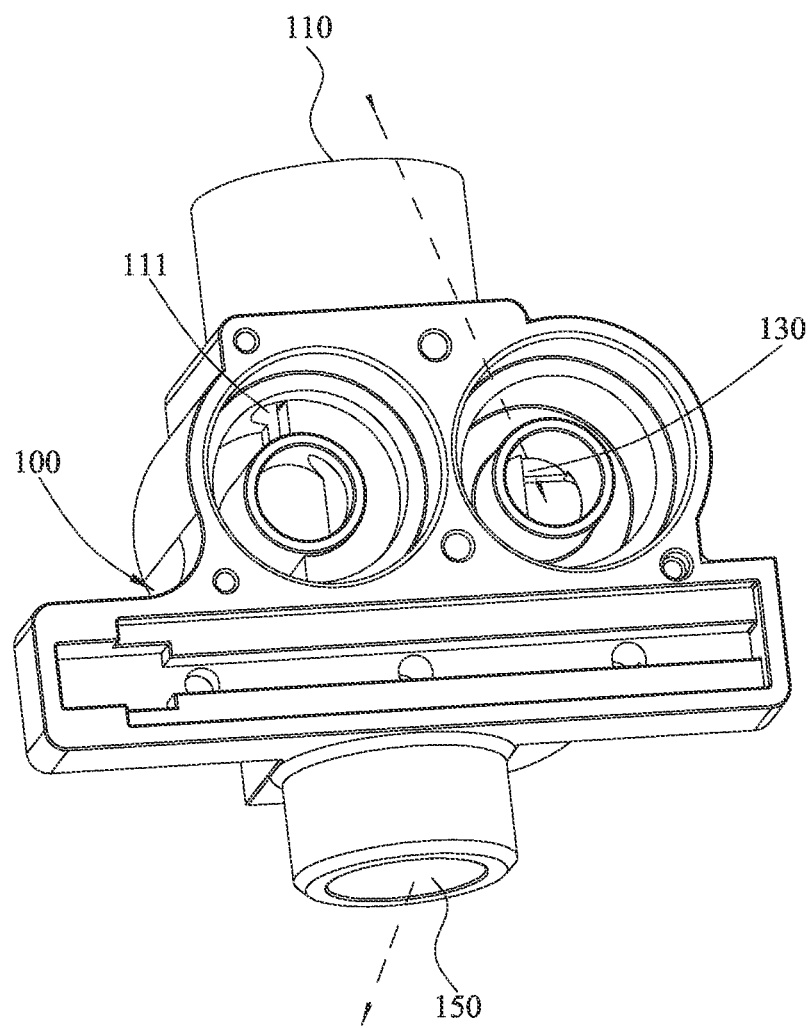
FIG. 8 shows the solid abridged general view of the inner structure of the outlet mechanism of the first embodiment, the second water passage is communicating with the water source.

According to FIG. 6 to 8, the water source is turned on, the first switch button 210 is pressed, the first limiting block 2421 coupling with the first switch button 210 is moved downward with the first switch button 210, and the limiting plate 241 is driven to slide horizontally, and the spring 244 is compressed, and then the first locating block 2421 is located at the first limiting hole 2431 of the limiting plate 241, and then the spring 244 is loosen, and the limiting plate stops sliding, and the first limiting block 2421 is coupling with the first limiting hole 2431 and located in the first limiting hole 2431, and at this moment the second switch button 220 and the reset button 230 keeps at original location, and the second limiting 2422 and the third limiting 2423 are both located above the limiting plate 241; because of the downward movement of the first switch button 210, the first control pole 211 drives the first sealing element 311 move downward to seal the first seal valve 321, and then the first water passage 120 is sealed by the first seal valve 321, and water flows into the second water passage 130 from the second inlet hole of the inlet end 110, and at last flows out of the second outlet end 150, and the second outlet end 150 is connected to the handheld shower in the present embodiment.

Figure 9:
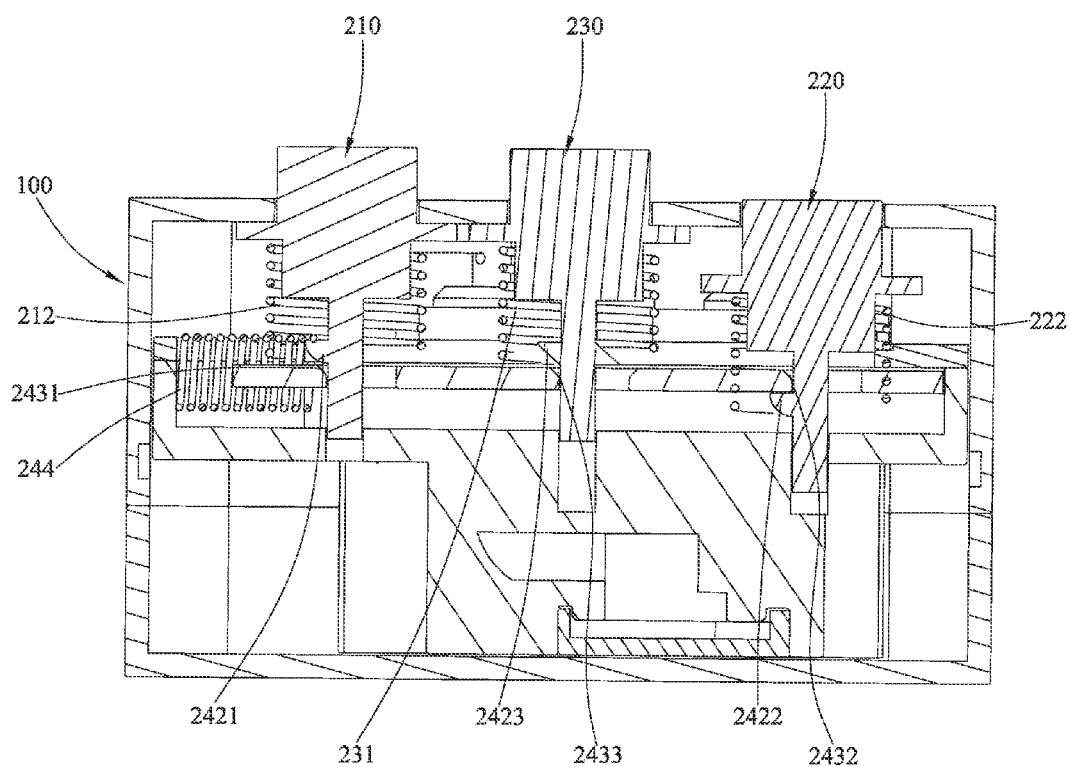
FIG. 9 shows the first sectional view of outlet mechanism of the first embodiment, the first water passage is communicating with the water source.
Figure 10:
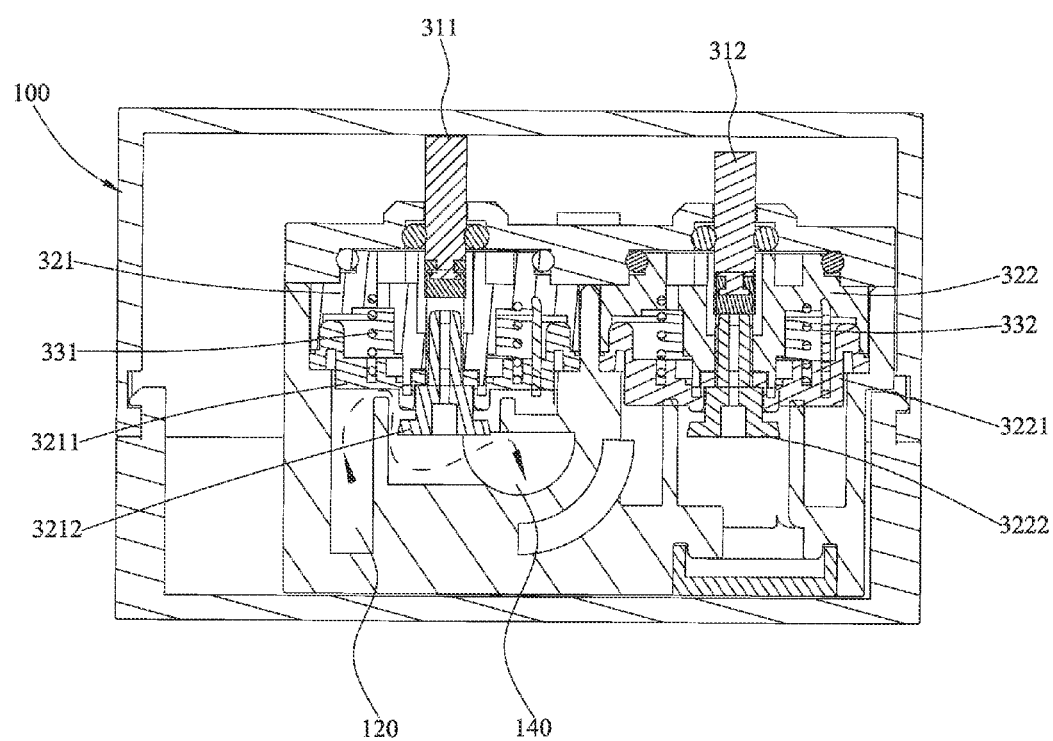
FIG. 10 shows the second sectional view of outlet mechanism of the first embodiment, the first water passage is communicating with the water source.
Figure 11:
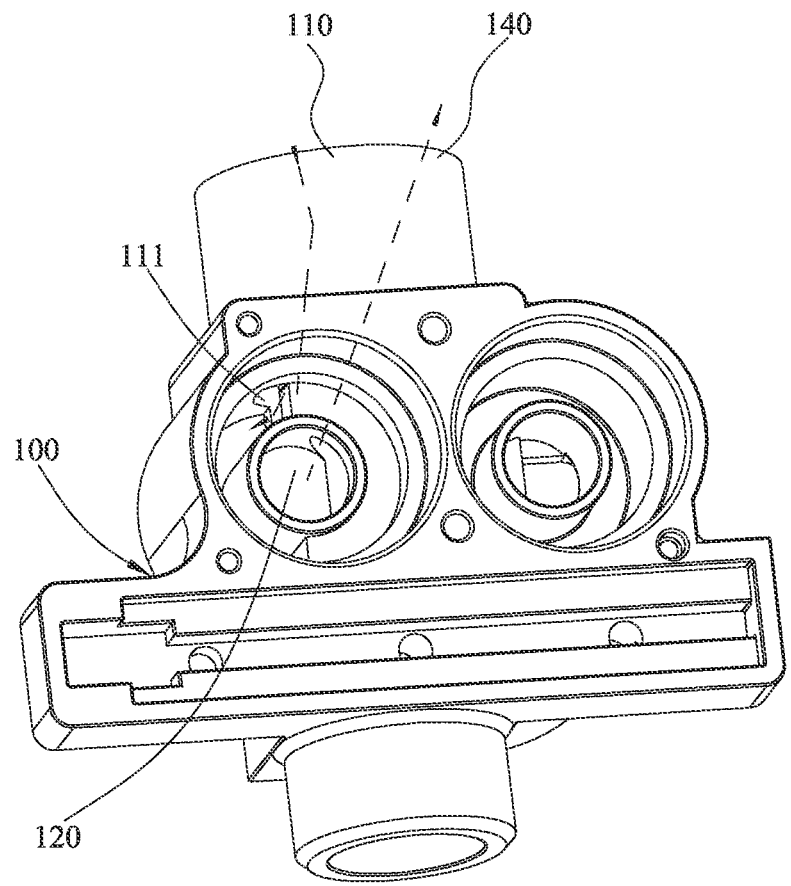
FIG. 11 shows the solid abridged general view of the inner structure of the outlet mechanism of the first embodiment, the first water passage is communicating with the water source.

According to FIG. 9 to 11, the second switch button 220 is pressed, the second limiting block 2422 coupling with the second switch button 220 is moved downward with the second switch button 220, and the limiting plate 241 is driven to slide horizontally, and the spring 244 is compressed, and then the second locating block 2422 is located at the second limiting hole 2432 of the limiting plate 241, and then the spring 244 is loosen, and the limiting plate 241 stops sliding, and the second limiting block 2422 is coupling with the second limiting hole 2432 and located in the second limiting hole 2432, and at this moment the first switch button 210 moves upward under action of the elastic force of the spring 212, and the first limiting block 2421 leaves the first limiting hole 2431, and the reset button 230 keeps at original location, and the first limiting block 2421 and the third limiting block 2423 are both located above the limiting plate 241; because of the upward movement of the first switch button 210, the first control pole 211 drives the first sealing element 311 move upward and the water pressure will overcome the seal effect from the first seal valve 321 to the first water passage 120, and the first water passage 120 is communicated with the inlet end 110, and the second switch button 220 moves downward, the seond control pole 221 drives the second sealing element 3112 move downward to seal the second seal valve 322, and then the second water passage 130 is sealed by the second seal valve 322, and water flows into the first water passage 120 from the first inlet hole 111 of the inlet end 110, and at last flows out of the first outlet end 140, and the first outlet end 140 is connected to the head shower in the present embodiment.

Figure 12:
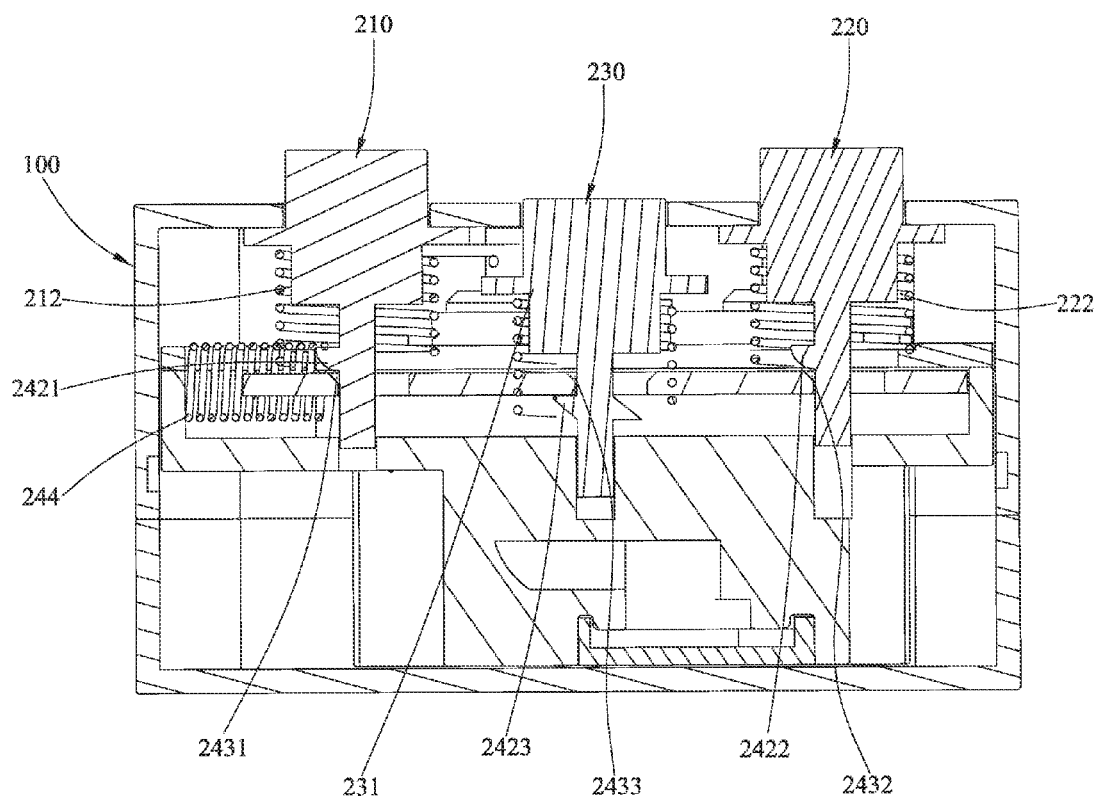
FIG. 12 shows the first sectional view of outlet mechanism of the first embodiment, the first and the second water passages are communicating with the water source.
Figure 13:
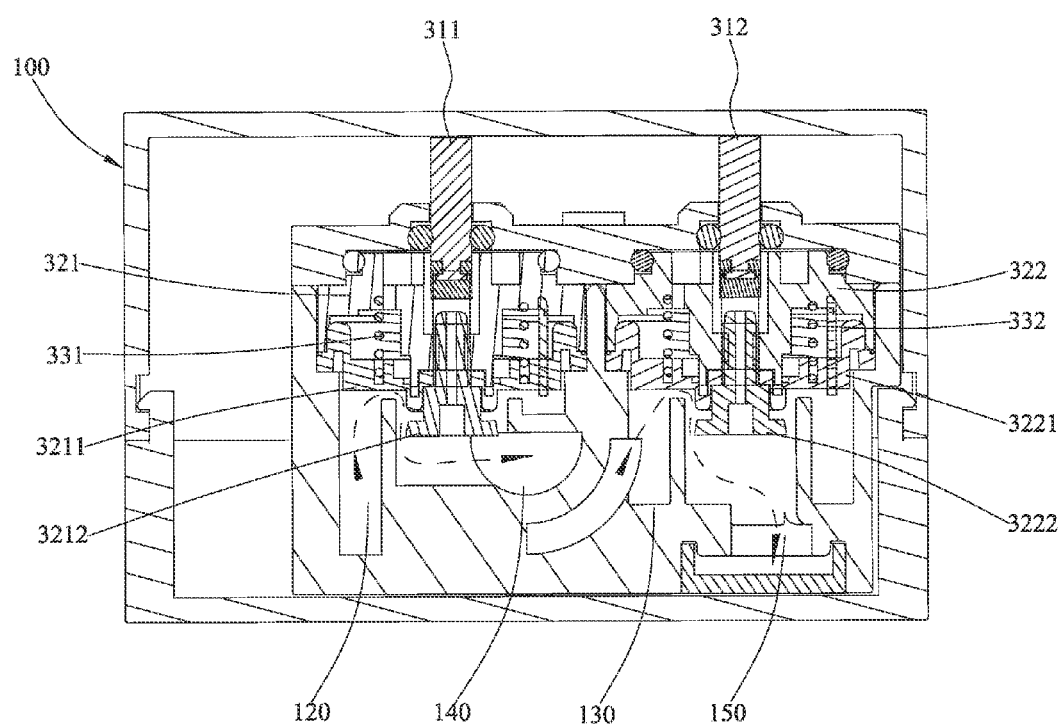
FIG. 13 shows the second sectional view of outlet mechanism of the first embodiment, the first and the second water passages are communicating with the water source.
Figure 14:
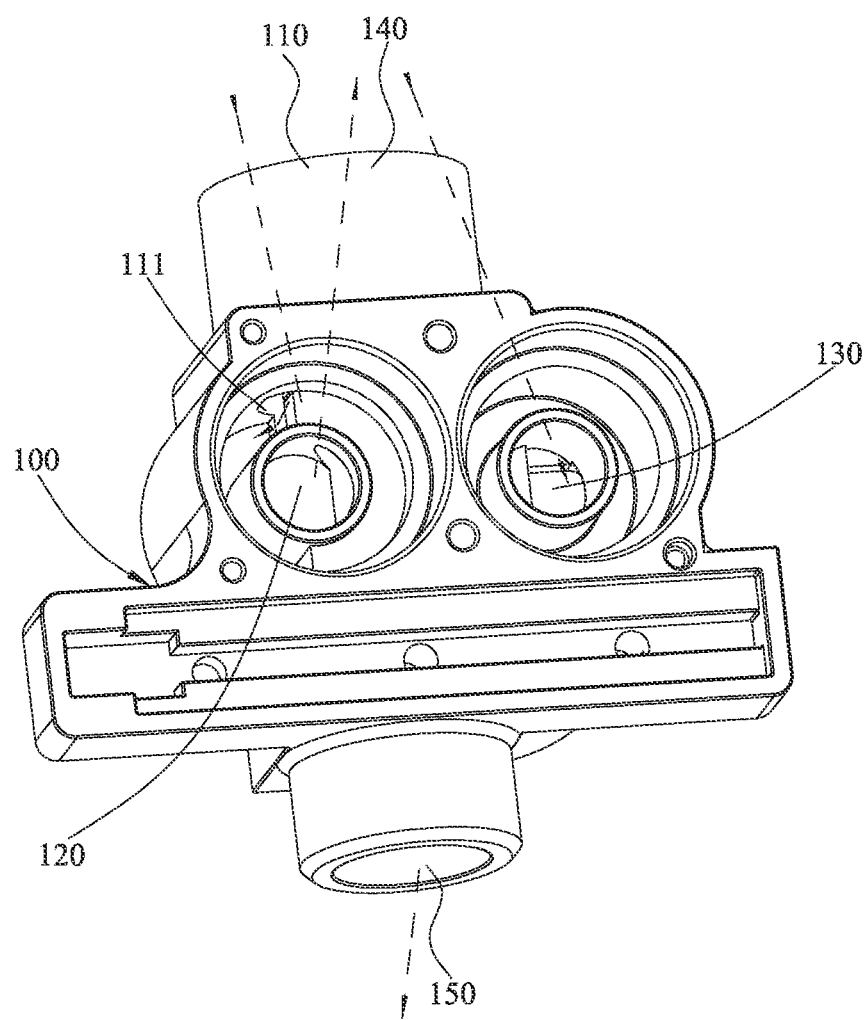
FIG. 14 shows the solid abridged general view of the inner structure of the outlet mechanism of the first embodiment, the first and the second water passages are communicating with the water source.

According to FIG. 12 to 14, the reset button 230 is pressed, the third limiting block 2423 coupling with the reset button 230 is moved downward with the reset button 230, and the limiting plate 241 is driven to slide horizontally, and the spring 244 is compressed, and then the third locating block 2423 is located at the third limiting hole 2433 of the limiting plate 241, and then the spring 244 is loosen, and the limiting plate 241 stops sliding, and the third limiting block 2423 is coupling with the third limiting hole 2433 and located in the third limiting hole 2433, therefore after the second switch button 220 moves upward under action of the elastic force of the spring 222, and the second limiting block 2422 leaves the second limiting hole 2432, and the first switch button 210 keeps at original location, and the first limiting block 2421 and the second limiting block 2422 are both located above the limiting plate 241; because of the upward movement of the second switch button 220, the second control pole 221 drives the second sealing element 312 move upward and the water pressure will overcome the seal effect from the second seal valve 322 to the second water passage 130, and the first water passage 120 and the second water passage 130 are both communicated with the inlet end 110, and water flows into the first water passage 120 and the second water passage 130 from the first inlet hole 111 and the second inlet hole of the inlet end 110 respectively, and at last flows out of the first outlet end 140 and the second outlet end 150, so that water comes out of the handheld shower and the head shower.

In the present embodiment, because the shapes of the first limiting block 2421 of the first switch button 210 and the second limiting block 2422 of the second switch button 220 are the same and are both different from the shape of the third limiting block 2423 of the reset button 230, the first switch button 210 and the second switch button 220 can be pressed simultaneously and located in the limiting plate 241, when both the said two switch buttons are pressed, the present outlet mechanism is at stop status.

Figure 15:
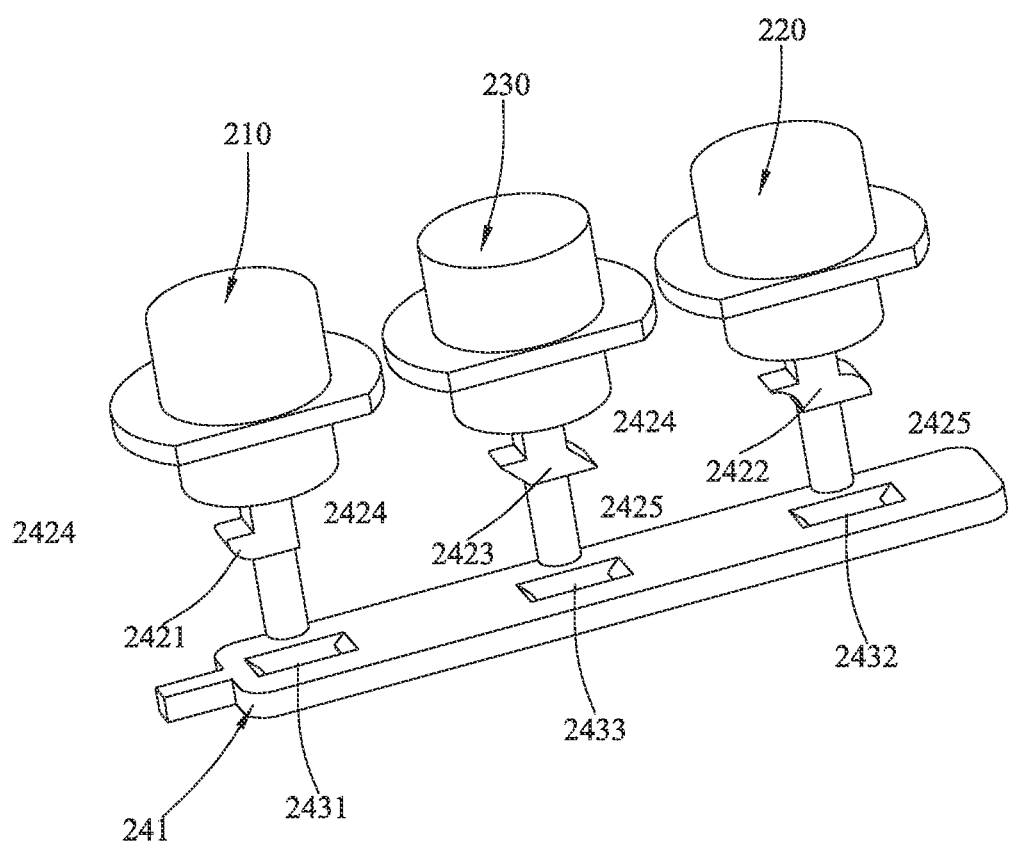
FIG. 15 shows the solid abridged general view of the limiting block of the second embodiment.

The second embodiment in the preferred embodiment is shown in FIG. 15, the main structure and outlet principle are the same to the first embodiment, it will not be described again, the shapes of the limiting blocks of the first switch button 210, the second switch button 220 and the reset button 230 are different from each other; the first limiting block 2421 is unilateral hooked with a bevel and an upper locating surface 2424; the third limiting block 2423 is bilateral hooked, one side of which is provided with a bevel and an upper locating surface 2424, the other side of which is provided with a lower bevel and a lower locating surface 2425, the vertical dimension between the upper locating surface 2424 and the lower locating surface 2425 is equal to the thickness of the limiting plate 241; the second limiting block 2422 is bilateral hooked, one side of which is provided with a cambered surface and an upper locating surface 2424, the other side of which is provided with a lower cambered surface and a lower locating surface 2425, the vertical dimension between the upper locating surface 2424 and the lower locating surface 2425 is equal to the thickness of the limiting plate 241, therefore, only one button can be pressed each time, and the outlet mechanism in the present embodiment is not provided with water-stop function.

The invention has been described with reference to the preferred embodiments mentioned above; therefore it cannot limit the reference implementation of the invention. It is obvious to a person skilled in the art that structural modification and changes can be carried out without leaving the scope of the claims hereinafter and the description above.

INDUSTRIAL APPLICABILITY

The design of the button switch outlet mechanism in the present invention is reasonable, the cooperation of the components is tight and artistic with effective and stable switch, convenient utility and good industrial applicability.

What is claimed is:

1. A button switch outlet mechanism, comprising:
a body communicating with a water source and in which at least two water passages are arranged;
a switch unit mounted in the body, comprising
at least two switch buttons, each being movable in an up and down direction;
a plurality of control poles, each being associated with a respective switch button; and
a limiting assembly comprising a limiting plate having limiting holes, and limiting blocks associated with the respective switch buttons, the limiting blocks being couplable with the respective limiting holes, the limiting plate being slidable in a horizontal direction to at least two positions along with the up and down movement of the respective switch buttons, the first position being that one of the switch buttons moves downward and is located in the limiting hole with the other switch button keeping still, the second position being that all the switch buttons are moved downward and are limited in the corresponding limiting holes simultaneously; and a water division unit mounted in the body, and comprising sealing elements and seal valves of which the number is equal to that of the switch buttons, the sealing elements being connected to the control poles respectively and being controlled by the control poles to control the corresponding seal valves to seal one of the water passages or communicate one of the water passages to the water source.

2. A button switch outlet mechanism according to claim 1, wherein the limiting blocks have the same shape, each having a unilateral hook with a bevel and an upper locating surface.

3. A button switch outlet mechanism according to claim 2, wherein the control poles are flexible, and sockets for connecting the control poles are arranged on the sealing elements.

4. A button switch outlet mechanism according to claim 1, wherein the switch unit further comprises a reset button that is locatable in the limiting plate after moving downward to thereby reset all of the switch buttons, the reset button being provided with a limiting block that couples with the limiting plate, and being bilaterally hooked, with one side of the limiting block of the reset button being provided with a bevel and an upper locating surface, and another side of which is provided with a lower bevel and a lower locating surface.

5. A button switch outlet mechanism according to claim 4, wherein the switch unit further comprises a plurality of springs coupling with the switch buttons and the reset button, respectively.

6. A button switch outlet mechanism according to claim 5, wherein, the control poles are arranged to the springs coupling with the switch buttons in a unibody manner.

7. A button switch outlet mechanism according to claim 6, wherein the control poles are flexible, and sockets for connecting the control poles are arranged on the sealing elements.

8. A button switch outlet mechanism according to claim 5, wherein the control poles are flexible, and sockets for connecting the control poles are arranged on the sealing elements.

9. A button switch outlet mechanism according to claim 4, wherein the control poles are flexible, and sockets for connecting the control poles are arranged on the sealing elements.

10. A button switch outlet mechanism according to claim 1, wherein each switch button is provided with a cover edge, and the control poles being located under the respective cover edges.

11. A button switch outlet mechanism according to claim 10, wherein the control poles are flexible, and sockets for connecting the control poles are arranged on the sealing elements.

12. A button switch outlet mechanism according to claim 1, wherein each switch button is provided with a cover edge, one end of a periphery of the cover edge extending outward to form the respective control pole.

13. A button switch outlet mechanism according to claim 12, wherein the control poles are flexible, and sockets for connecting the control poles are arranged on the sealing elements.

14. A button switch outlet mechanism according to claim 1, wherein, the limiting assembly further comprises a spring that urges against the limiting plate in the horizontal direction, and which is compressed or loosened along with the horizontal sliding of the limiting plate.

15. A button switch outlet mechanism according to claim 14, wherein the control poles are flexible, and sockets for connecting the control poles are arranged on the sealing elements.

16. A button switch outlet mechanism according to claim 1, wherein the control poles are flexible, and sockets for connecting the control poles are arranged on the respective sealing elements.

17. A button switch outlet mechanism, comprising:
a body communicating with a water source and in which at least two water passages are arranged;
a switch unit mounted in the body, comprising
at least two switch buttons, each being movable in an up and down direction;
a plurality of control poles, each being associated with a respective switch button;
a limiting assembly comprising a limiting plate having limiting holes, and limiting blocks associated with the respective switch buttons, the limiting blocks being couplable with the respective limiting holes, the limiting plate being slidable in a horizontal direction to at least two positions along with the UP and down movement of the respective switch buttons, the first position being that one of the switch buttons moves downward and is located in the limiting hole with the other switch button keeping still, the second position being that the other switch button is moved downward and is located in the corresponding limiting hole and the switch button located at the first position is reset; and
a reset button locatable in the limiting plate after moving downward to thereby reset all of the switch buttons; and
a water division unit mounted in the body, and comprising sealing elements and seal valves of which the number is equal to that of the switch buttons, the sealing elements being connected to the control poles respectively and being controlled by the control poles to control the corresponding seal valves to seal one of the water passages or communicate one of the water passages to the water source.

18. A button switch outlet mechanism, comprising:
a body communicating with a water source and in which at least two water passages are arranged;
a plurality of switch buttons, each being movable in an up and down direction; and
a limiting assembly comprising a limiting plate having limiting holes, and limiting blocks associated with the respective switch buttons, the limiting blocks being couplable with the respective limiting holes, the limiting plate being slidable in a horizontal direction to at least two positions along with the up and down movement of the respective switch buttons, the first position being that one of the switch buttons moves downward and is located in the limiting hole with other switch buttons keeping still, the second position being that another switch button moves downward and is located in the corresponding limiting hole and the switch button located at the first position is reset;
wherein, the shapes of the limiting blocks of the switch buttons and the reset button are different from each other; the limiting block of one switch button is unilaterally hooked with a bevel and an upper locating surface, the limiting block of another switch button is bilaterally hooked, one side of which is provided with a cambered surface and an upper locating surface, the other side of which is provided with a lower cambered surface and a lower locating surface; the limiting block of the reset button is bilaterally hooked, one side of which is provided with a bevel and an upper locating surface, the other side of which is provided with a lower bevel and a lower locating surface.

* * * * *